United States Patent

Martin

[15] 3,683,365

[45] Aug. 8, 1972

[54] ALPHANUMERIC MESSAGE READOUT CIRCUIT

[72] Inventor: Stephen J. Martin, Miami, Fla.

[73] Assignee: Robertshaw Controls Company, Richmond, Va.

[22] Filed: April 6, 1970

[21] Appl. No.: 25,697

[52] U.S. Cl. ..................................340/325, 340/379

[51] Int. Cl. ..........................................G09f 11/10

[58] Field of Search......340/324, 325, 167, 168, 378, 340/379; 40/28

[56] References Cited

UNITED STATES PATENTS

| | | | |
|---|---|---|---|
| 3,548,403 | 12/1970 | Johnson | 340/325 |
| 3,267,456 | 8/1966 | Morris et al. | 340/325 |
| 3,366,945 | 1/1968 | Bowman | 340/324 |

*Primary Examiner*—John W. Caldwell
*Assistant Examiner*—Marshall M. Curtis
*Attorney*—Anthony A. O'Brien

[57] ABSTRACT

A code conversion and display circuit for providing a perceptible readout of a coded alphanumeric message formed by a series of tone burst signals. The circuit includes a tone burst converter adapted to transform the alphanumeric message into a pulse coded signal which is applied through a sequentially stepped steering network to a plurality of readout devices such that each readout device displays a single alphanumeric character of the message in response to a respective one of the tone burst signals.

3 Claims, 5 Drawing Figures

INVENTOR
STEPHEN J. MARTIN
BY Anthony A. O'Brien
ATTORNEY

INVENTOR
STEPHEN J. MARTIN
BY Anthony A. O'Brien
ATTORNEY

INVENTOR
STEPHEN J. MARTIN
BY Anthony A. O'Brien
ATTORNEY

INVENTOR
STEPHEN J. MARTIN
BY
Anthony A. O'Brien
ATTORNEY

ALPHANUMERIC MESSAGE READOUT CIRCUIT

BACKGROUND OF THE INVENTION

1. Field of the Invention

The present invention pertains generally to display circuits and more particularly to a code conversion and readout circuit for providing a visually perceptible readout of a coded alphanumeric message formed by a series of tone burst signals.

2. Description of the Prior Art

With the advent of solid state electronics and the development of refined communication techniques incorporating such concepts as multiplexing, pulse coding and data compression, the collection, storage and transmission of information in the form of alphanumeric messages has become increasingly important in such diversified areas as business, education and defense, to name but a few. The increased utilization of such data processing and communication concepts is due, to a great extent, to the wedding of various electrical equipment to the modern telephone system resulting in the rapid, convenient and efficient communication of information between points often separated by great distances. Automatic security systems for homes, businesses, etc., for example, are presently being developed such that upon the occurrence of a specified alarm condition, an alphanumeric message is automatically transmitted through a conventional public telephone system to a central monitoring complex where it is received, identified and properly acknowledged. Systems typified by the above have created a need for a relatively simple method for permitting efficient monitoring of various alphanumeric messages, the most desirable of which contemplates the immediate conversion and storage of a received message in a form which is visually perceptible to an operator.

While a number of conversion and readout devices have been developed in the past, they have not proven entirely satisfactory for a number of reasons since they are often highly complex, are not readily adaptable to the receipt of different types of signals, are subject to inaccurate operation and do not possess the capability of being automatically reset prior to the transmission of a succeeding message.

SUMMARY OF THE INVENTION

The present invention is generally characterized in that a message readout circuit responsive to a coded alphanumeric message formed by a series of spaced tone burst signals includes an input network adapted to receive the coded alphanumeric message, a circuit connected with the input network for generating a series of spaced pulse trains in response to the series of spaced tone burst signals, a plurality of readout circuits each having an input and perceptibly displaying an alphanumeric character corresponding to a received pulse train at the input, a switching circuit connected with the inputs of the plurality of readout circuits and the generating circuit applying the pulse trains to one of the plurality of readout circuits and responsive to a shift signal for applying the series of pulse trains to a next succeeding one of the plurality of readout circuits, and a circuit connected with the switching circuit and the generating circuit for detecting a termination of each one of the series of spaced pulse trains and generating a shift signal in response to the pulse train termination whereby the switching circuit applies successive signal pulse trains to successive ones of the plurality of readout circuits for displaying the coded alphanumeric message.

It is an object of the present invention to convert a coded alphanumeric message formed by a series of tone burst signals into a visually perceptible form.

The present invention has an additional object in that each of a plurality of tone burst information signals are sequentially directed to a like plurality of display devices.

It is a further object of the present invention to construct an alphanumeric message readout circuit for receiving a series of tone burst signals, directing each of the tone burst signals to a respective readout device, and resetting each of the readout devices prior to the receipt of a subsequent message.

A further object of the present invention is the provision of a tone burst responsive conversion and readout circuit utilizing fewer component parts than the number of components heretofore necessary.

Further objects and advantages of the present invention will be apparent from the following description of the preferred embodiment when taken in conjunction with the accompanying drawings.

DESCRIPTION OF THE PREFERRED EMBODIMENT

Figure 1:
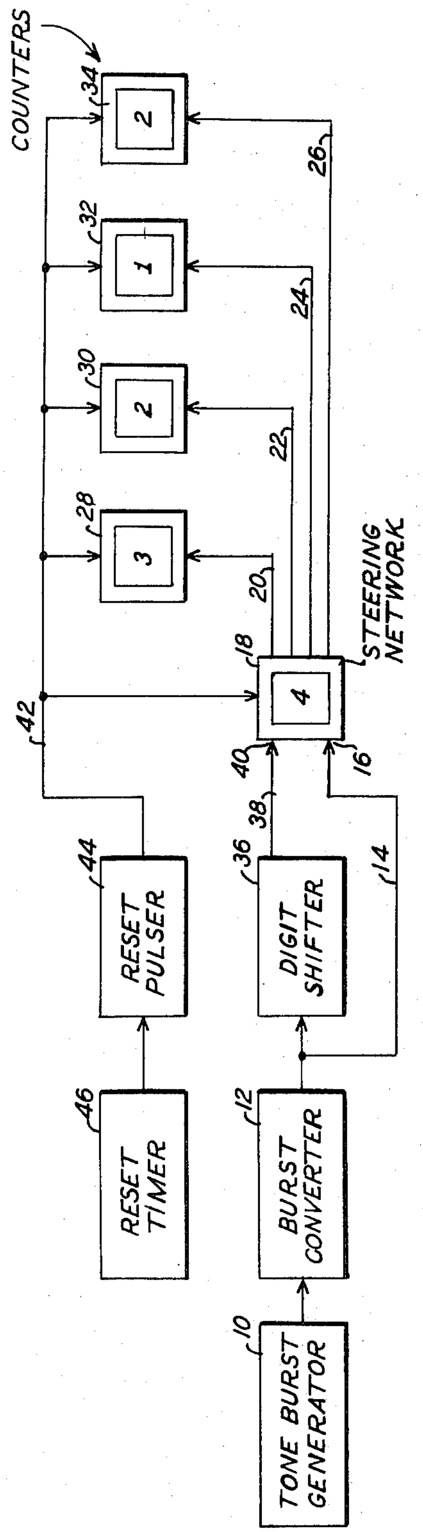
FIG. 1 is a block diagram of a preferred embodiment of an alphanumeric message readout circuit according to the present invention.

The present invention, as illustrated in block diagram form in FIG. 1 is adapted to be utilized in conjunction with a suitable source of tone burst signals forming an alphanumeric message. Such source may be of any well known type, such as a conventional tape deck upon which has been prerecorded a tone burst coded alphanumeric message, and is illustrated in FIG. 1 as a tone-burst generator 10 for the sake of brevity. The tone burst coded alphanumeric message generated by the tone-burst generator 10 is coupled to the readout circuit of the present invention either directly or through an intermediate communication medium such as a conventional public telephone system (not shown) whereupon it is fed to an input of a burst converter circuit 12. The burst converter 12 transforms the tone burst signals into a series of pulse train signals which are fed via line 14 to a common input 16 of a steering network 18. The steering network 18 sequentially applies the pulse train signals appearing at input 16 to a plurality of output lines 20,22, 24 and 26 which are connected to a like plurality of pulse counting readout devices 28, 30, 32 and 34, respectively.

The pulse train signals transformed by the burst converter 12 are also fed to the input of a digit shifter 36 which generates a shift pulse in response to the termination of each of the received pulse trains. The generated shift pulse is applied via line 38 to a shift input 40 of the steering network 18 such that the pulse train signals appearing at input 16 thereof will be sequentially coupled to successive ones of the counters 28, 30, 32 and 34 so that each of the counters displays a single alphanumeric character corresponding to a single one of the pulse train signals of the incoming message. As illustrated, the steering network is provided with a suitable readout device such that the number of shift pulses generated by the digit shifter 36, which corresponds to the number of individual alphanumeric characters contained in a received message, is visually displayed.

The counters as well as the steering network 18 are connected to a common reset bus 42 which is connected to an output of a reset pulser 44. The reset pulser 44 may be manually operated or may be automatically energized for a preset time interval by a reset timer circuit 46 so as to generate a reset pulse train of sufficient duration to reset the counters and the steering network 18 to an initial or standby position.

Figure 2:
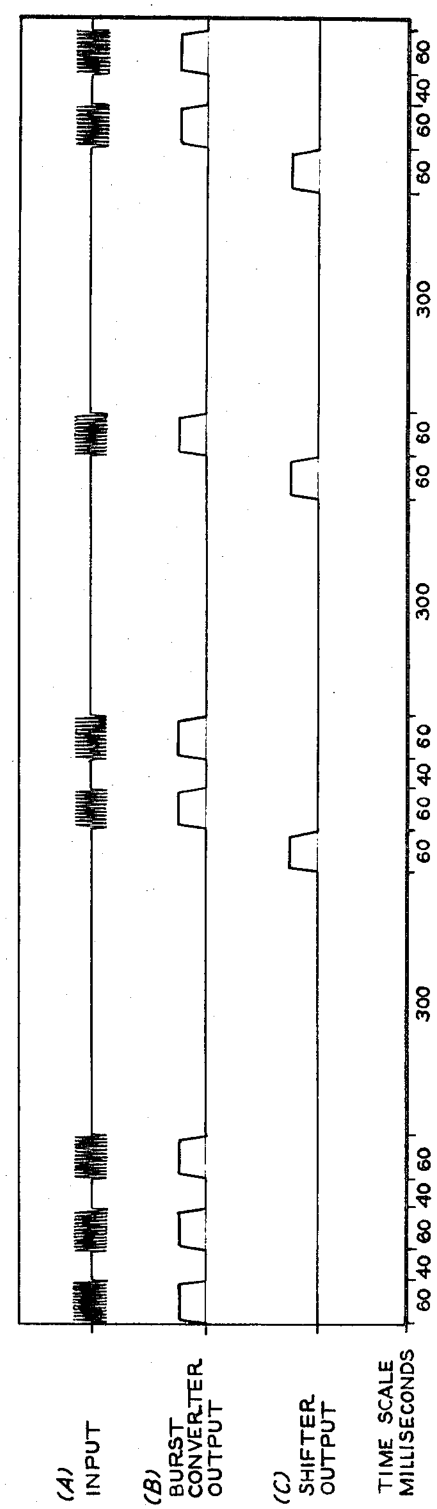
FIG. 2 is a set of timing curves illustrating a sequence of operation of the network of FIG. 1.

Before proceeding to a detailed description of the circuitry and overall operation of the message readout circuit of the present invention, a general outline of a typical sequence of operation may be helpful. Referring to FIG. 2, curve A represents a time plot of a typical tone-burst coded message produced by the tone-burst generator 10. For the purposes of the present example, it is noted that the alphanumeric message is in the form of a series of numbers, namely 3-2-1-2, which may correspond to an address, for example, to be transmitted from a remote point to a central monitoring complex. As shown in curve A, the message contains four tone burst signals, each of which carry information pertaining to a single character of the complete message; i.e., the first tone-burst signal contains three tone bursts corresponding to the numeral "3", the second tone burst signal contains two tone bursts corresponding to the numeral "2", etc. The tone burst signals are received by the burst convertor 12 where they are transformed into a series of pulse train signals, as illustrated in curve B, the first pulse train containing three pulses, the second containing two pulses, etc.

As mentioned briefly above, the steering network 18 of FIG. 1, sequentially applies the transformed pulse train signals from the burst converter 12 to respective ones of the readout counters 28, 30, 32 and 34. Thus, when the system is reset and is ready to receive an incoming message, the steering network 18 will apply the first received pulse train via line 20 to pulse counter 28. As shown in curve B of FIG. 2, the first pulse train in the illustrated example contains three pulses which cause the pulse counter 28 to be stepped three times so as to display the numeral "3". At this same time, the digit shifter 36 is receiving the transformed pulse trains and detects the termination of the first pulse train. After a preset time delay, which may be 300 milliseconds, for example, the digit shifter 36 generates a shift pulse output signal, as shown in curve C of FIG. 2, for sequencing the steering network 18 such that the second pulse train is fed to output line 22 and thence to the second pulse counter 30. As shown in curve B of FIG. 2, the second pulse train includes two pulses corresponding to the receipt of two spaced tone bursts and results in the stepping of pulse counter 30 to its second position for displaying the numeral "2". As before, the digit shifter 36 detects the termination of the second received pulse train and a preset time delay later generates a shift signal (curve C) for sequencing the steering network 18 to its third position such that the third pulse train is coupled to the third pulse counter 32.

The above recited sequence of operation will continue until the entire message has been received whereupon it will be displayed by the counters in a visually perceptible form. It is also noted that the steering network 18 is designed to display a numerical character corresponding to its sequence position such that an operator may readily correlate the displayed message with the number of alphanumeric characters which have been received so as to detect a missing digit and recognize a possible error.

Figure 3:
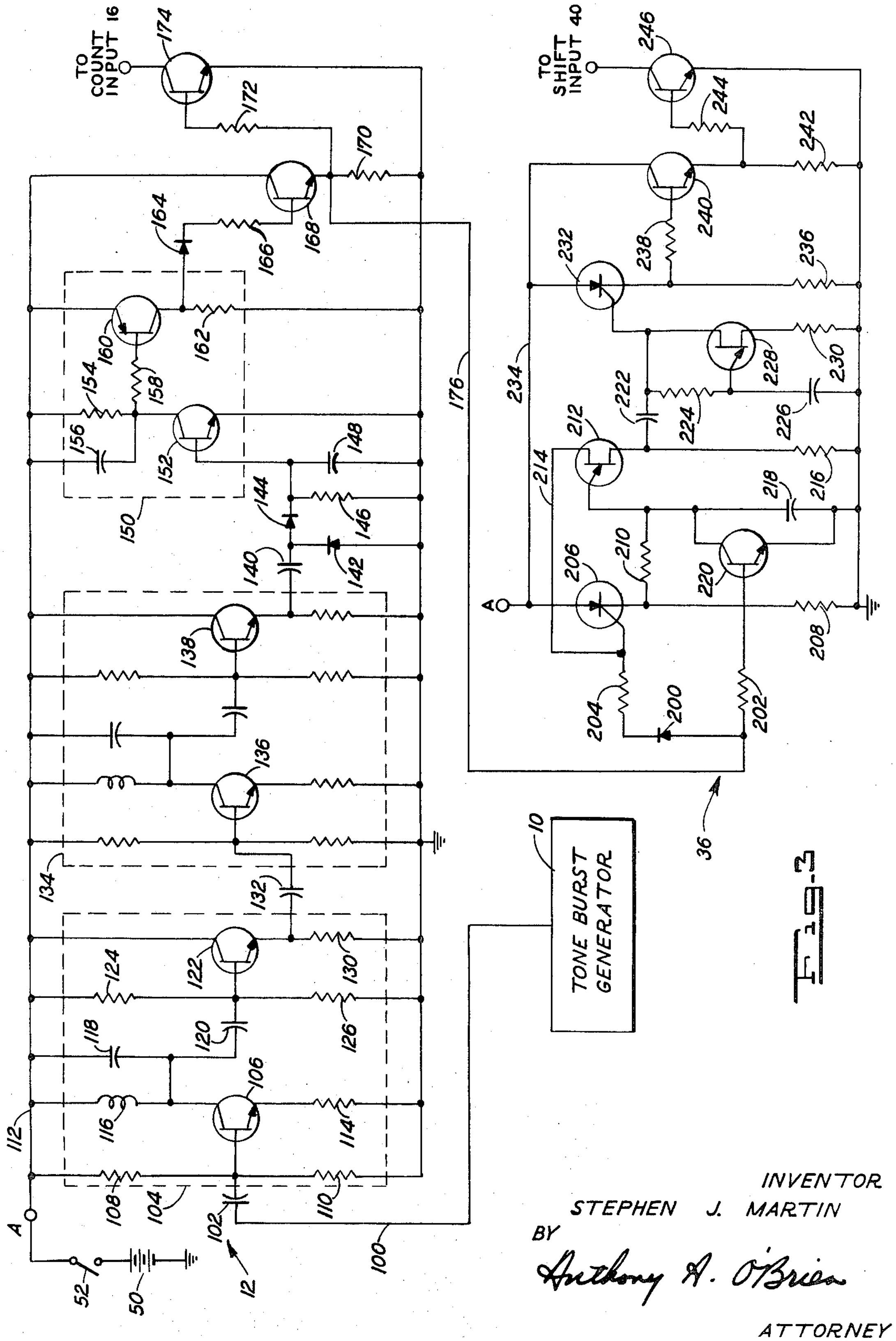
FIG. 3 is a schematic diagram of the tone-burst generator, burst converter and digit shifter of FIG. 1.

Referring now more specifically to the circuit details and construction of the readout circuit of the present invention, the tone-burst generator, burst converter, and digit shifter of the block diagram of FIG. 1 are schematically illustrated in FIG. 3. The burst converter 12 and digit shifter 36 are energized by a source of positive voltage 50 through a master power switch 52 to a common power point A. A lead 100 connects the output from the tone-burst generator 10 to the input of burst converter 12 at a coupling capacitor 102 which feeds the incoming tone burst signals to a first amplifying stage illustrated within dashed lines 104. The amplifying stage 104 includes an NPN amplifying transistor 106 which is biased to its operating point by biasing resistors 108 and 110 which are connected in series between a main power bus 112 and ground. The main power bus 112 is connected to power point A, while the junction of resistors 108 and 110 is coupled to the base electrode of NPN transistor 106. A third biasing resistor 114 is connected between the emitter electrode of transistor 106 and ground, and the collector electrode of the transistor is coupled to the main power bus 112 through a parallel network formed by an inductor 116 and a capacitor 118. The collector of transistor 106 is additionally connected by a coupling capacitor 120 to an NPN emitter-follower transistor 122 which is biased at its base electrode by a pair of resistors 124 and 126 which are serially connected between power bus 112 and ground. The transistor 122 has its collector electrode connected directly to power bus 112 and its emitter electrode coupled to ground through an additional biasing resistor 130.

The output of amplifier 104 is taken from the emitter electrode of emitter-follower transistor 122 and coupled through coupling capacitor 132 to the input of a second amplifying stage 134. The second stage amplifier 134 includes an amplifying transistor 136 and an emitter-follower transistor 138 connected in circuit in the identical manner as that of the first amplifying stage 104; the structural details of the second stage amplifier 134 will thus not be described again to avoid repetition.

The amplified tone burst signals are taken from the emitter electrode of emitter-follower transistor 138 of the second stage amplifier 134 and fed through a coupling capacitor 140 to the cathode electrode of a diode rectifier 142 as well as to the anode electrode of a diode rectifier 144. The anode electrode of diode 142 is directly coupled to ground while the cathode electrode of rectifier 144 is coupled to ground through a parallel network formed by a smoothing resistor 146 and a filter capacitor 148.

The smoothed and rectified signals are thereafter coupled to the input of a wave shaping network indicated generally by dashed lines 150 and including an NPN transistor 152 which has its base electrode connected to the common junction of diode 144, resistor 146 and capacitor 148. The emitter electrode of transistor 152 is directly coupled to ground while its collector electrode is tied to power bus 112 through a resistor 154 and a parallel connected capacitor 156. The collector of transistor 152 is further coupled through a resistor 158 to the base electrode of a PNP transistor 160 which has its emitter electrode coupled directly to main power bus 112 and its collector electrode returned to ground through a biasing resistor 162.

The shaped output signals from network 150 are coupled from the collector electrode of transistor 160 to the anode of a diode 164 which has its cathode electrode coupled through a resistor 166 to the base electrode of an NPN transistor 168. Transistor 168 has its collector electrode directly connected to main power bus 112 and its emitter electrode returned to ground through a resistor 170. The emitter of transistor 168 is also coupled through a resistor 172 to the base electrode of an NPN switching transistor 174 which has its emitter directly returned to ground and its collector electrode coupled to the count input 16 (FIG. 1) of the steering network 18.

The emitter electrode of transistor 168 is also connected via a line 176 to the input of the digit shifter 36 at a junction of the anode electrode of a diode 200 and a resistor 202. The cathode of diode 200 is connected through a resistor 204 to the gate electrode of a controlled rectifier 206 which may be of any suitable type such as a silicon controlled rectifier (SCR), a gate controlled switch (GCS) or a thyristor. The anode electrode of controlled rectifier 206 is connected to power point A while its cathode electrode is returned to ground through a biasing resistor 208. The cathode electrode is also connected through a resistor 210 to the emitter electrode of a unijunction transistor 212 which has a first base electrode coupled by a line 214 to the gate electrode of controlled rectifier 206 and a second base electrode coupled through a resistor 216 to ground. The emitter electrode of the unijunction transistor 112 is also connected to ground through a parallel network including a capacitor 218 and the collector-emitter path of an NPN transistor 220 which has its base electrode connected to resistor 202.

The junction of the second base electrode of unijunction transistor 212 and resistor 216 is connected to one side of a coupling capacitor 222 which has its other terminal serially coupled through a resistor 224 and a capacitor 226 to ground. The junction of resistor 224 and capacitor 226 is connected to the emitter electrode of a second unijunction transistor 228 which has a first base electrode connected through a resistor 230 to ground and a second base electrode connected to the junction point of capacitor 222 and resistor 224. The second base electrode of unijunction transistor 228 is additionally coupled to the gate electrode of a second controlled rectifier 232 which, like controlled rectifier 206, may be of any suitable type. The anode of controlled rectifier 232 is connected to power point A via a power bus 234 while its anode electrode is returned to ground through a resistor 236. The junction point of the anode electrode of controlled rectifier 232 and resistor 236 is connected through a resistor 238 to the base electrode of an NPN transistor 240 which has its collector-emitter path serially connected with a biasing resistor 242 between power bus 234 and ground. The emitter electrode of transistor 240 is further coupled through a resistor 244 to the base electrode of an additional NPN transistor 246 which has its emitter returned directly to ground and its collector electrode coupled to shift input 40 (FIG. 1) of the steering network 18.

Figure 4:
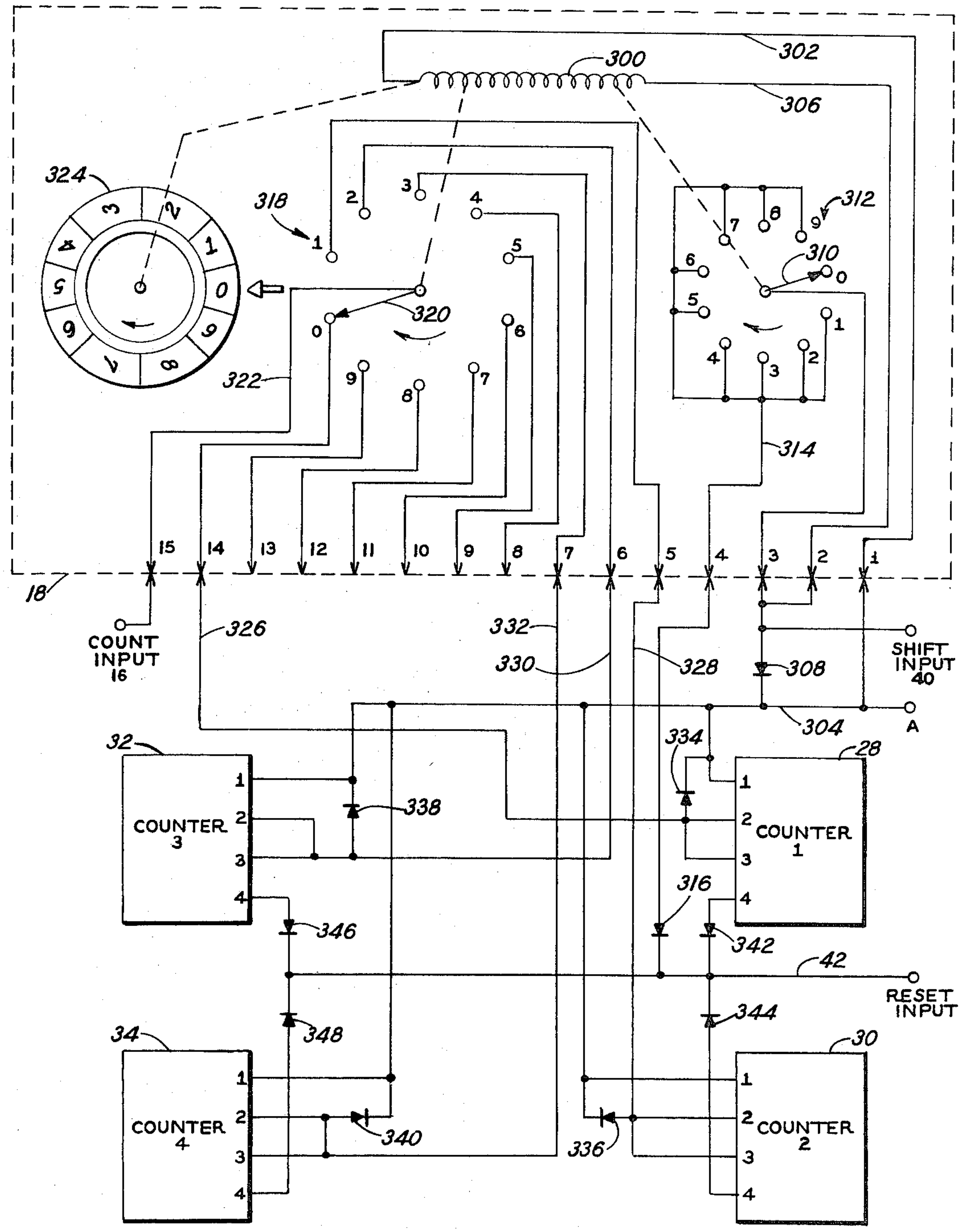
FIG. 4 is a schematic diagram of the steering network and counters of FIG. 1.

The steering network 18 and the pulse counters 28, 30, 32 and 34 are illustrated in schematic form in FIG. 4. The steering network 18 includes a stepping coil 300 connected at one side through a line 302 and a terminal pin 1 to a power bus 304 which is in turn connected to power point A. The other side of stepping coil 300 is connected via line 306 and terminal pin 2 to the shift input 40 as well as to the anode electrode of a diode 308. The diode 308 has its cathode electrode connected to power bus 304 and acts as a transient pulse filter to protect the steering network 18.

The shift input 40 is additionally connected through terminal pin 3 to the wiper arm 310 of a ten-position rotary switch 312 which is adapted to be sequentially stepped from position to position in response to pulse energization of the stepping coil 300. The rotary switch 312 includes ten fixed contacts labeled 0 through 9; contact 0 is not connected to any of the external circuitry of the steering network 18 while fixed contacts 1 through 9 are connected in common through a line 314 and terminal pin 4 to the anode electrode of a diode 316. The cathode electrode of diode 316 is coupled to the reset input line 42 so as to receive the output signals from the reset pulse circuit 44 (FIG. 1).

The steering network 18 includes a second rotary switch 318 having a wiper arm 320 which is adapted to be stepped by stepping coil 300 in a similar manner to that of rotary switch 312. The wiper arm 320 is connected by a line 322 and terminal pin 15 to the count input 16 of the steering network 18 for receiving the pulse train signals from the burst converter 12 (FIG. 1). Rotary switch 318 further includes fixed contacts labeled 0 through 9 with contact 0 connected to terminal pin 14 of steering network 18 and contacts 1 through 9 respectively connected to terminal pins 5 through 13. The steering network 18 includes a display wheel 324 provided with indicia in the form of digits 0 through 9 equally spaced from each other about the periphery of the wheel. The display wheel 324 is adapted to be sequentially rotated in response to the pulsed energization of stepping coil 300 in a similar manner to that of switches 312 and 318. As indicated by the arrow adjacent the numeral 0 of the display wheel 324 in FIG. 4, only a single digit is visible at any time depending upon the rotational position of the display wheel as controlled by stepping coil 300. It should be noted at this point, that while rotary switches 312 and 318 as well as the display wheel 324 have been illustrated as having ten positions, any desired number of positions may be provided in accordance with the expected number of alphanumeric characters contained within an alphanumeric message to be received, as will become clear below.

Counter circuits 28, 30, 32 and 34 are identical in construction to that of the steering network 18 with the exception of the exclusion of rotary switch 318. In other words, each of the counter circuits includes a stepping coil, a rotary switch and a display wheel corresponding both in construction and operation to coil 300, switch 312 and wheel 324 of steering network 18. For this reason, the counter circuits have been simply illustrated in block form with their respective terminal pin connections identically numbered to that of the steering network.

Thus, in a manner similar to that of the steering network 18, terminal pin 1 of each of the counter circuits 28, 30, 32 and 34 is connected to power bus 304 while terminals 2 and 3 of each of the counters are connected together and are fed via lines 326, 328, 330 and 332, to terminal pins 14, 5, 6 and 7, respectively, of the steering network 18. The anode electrode of a diode 334 is connected to the junction of pins 2 and 3 of counter circuit 28 while its cathode electrode is connected to terminal pin 1 thereof. Similarly, diodes 336, 338 and 340 are connected between the junction point of terminal pins 2 and 3 and terminal pin 1 of counters 30, 32 and 34, respectively. The cathode electrodes of an additional set of diodes 342, 344, 346 and 348 are connected to reset line 42 while their respective anode electrodes are connected to terminal pin 4 of counter circuits 28, 30, 32 and 34.

It is pointed out that the rotary switch and display wheel of each of the counter circuits 28, 30, 32 and 34 may contain any number of positions corresponding to a like number of alphanumeric characters to be displayed. In other words, each of the counter circuits may contain a rotary switch and a display wheel which have 36 positions, for example, the first ten of which may correspond to the numerals 0 through 9 while the remaining 26 may correspond in alphabetic order to the letters A through Z. In this manner, any alphanumeric character may be displayed by each of the counter networks such that messages containing various combinations of letters and numerals may be readily perceived; e.g., the first counter 28 may be stepped five times to display the numeral 5, the second counter 30 may be stepped ten times to display the letter A, etc.

Figure 5:
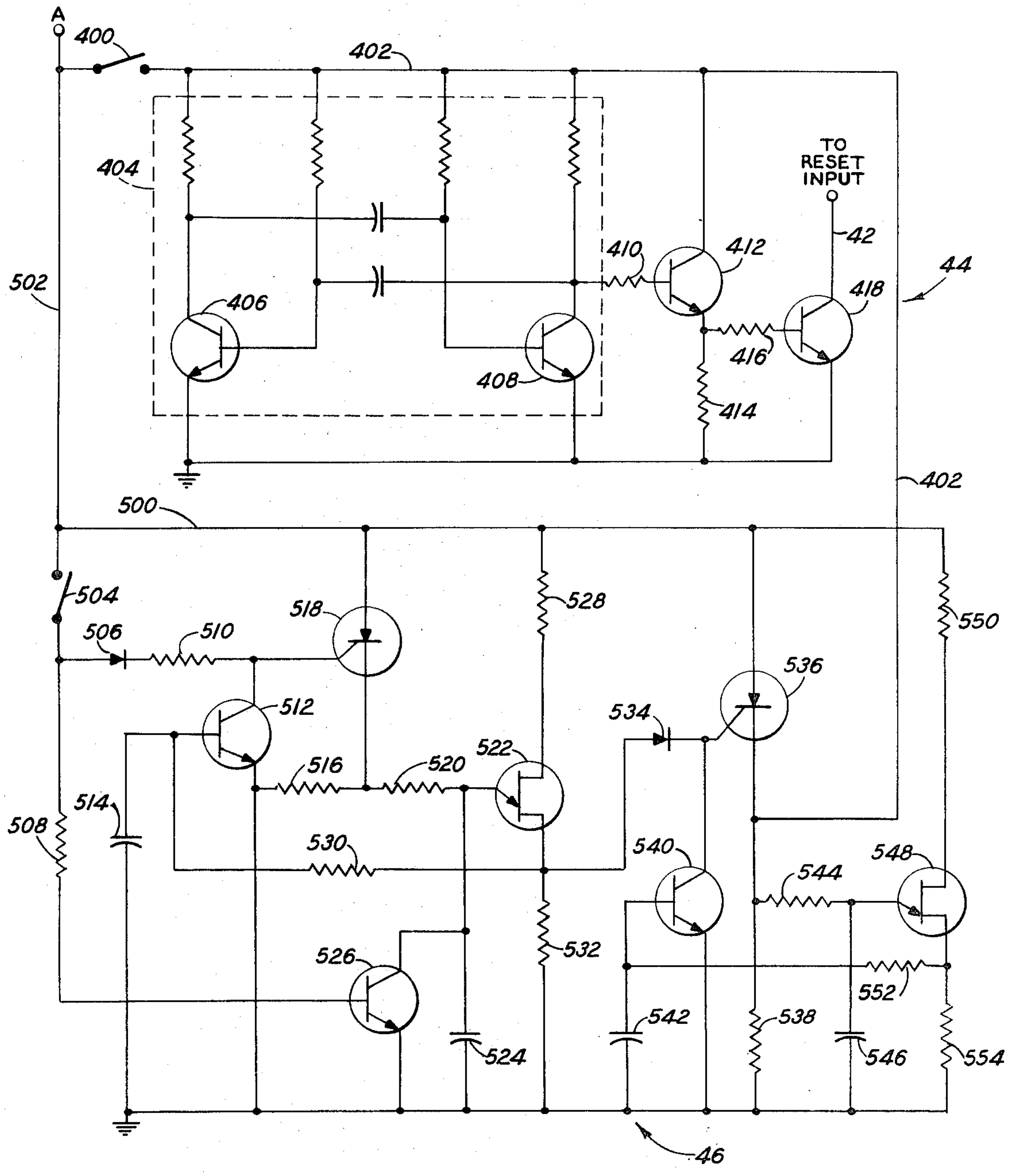
FIG. 5 is a schematic diagram of the reset timer and reset pulser of FIG. 1.

Referring now to FIG. 5, the reset pulser 44 includes a manually operable switch 400 which is normally biased to its opened position, as illustrated, and is connected between power point A and a power bus 402. The reset pulser 44 further includes a square-wave pulse train generator which may be of any suitable type such as a bistable multivibrator 404 connected between power bus 402 and ground. The bistable multivibrator or flip-flop includes a first transistor 406 and a second transistor 408 which has its collector electrode connected through a coupling resistor 410 to the base electrode of an NPN transistor 412. The collector electrode of transistor 412 is connected to power bus 402 while its emitter electrode is coupled to ground through a resistor 414 and is further coupled by a resistor 416 to the base electrode of an NPN transistor 418. The emitter electrode of transistor 418 is connected to ground while its collector electrode is connected to the reset inputs of steering network 18 and pulse counters 28, 30, 32 and 34 via reset line 42.

The reset timer 46 includes a power bus 500 which is connected via a line 502 to power point A, and a manually operable switch 504 which has a first terminal connected to power bus 500 and a second terminal connected to the junction point of the anode electrode of a diode 506 and a resistor 508. The cathode of diode 506 is connected through a resistor 510 and the collector-emitter path of an NPN transistor 512 to ground. The base electrode of transistor 512 is coupled to ground through a capacitor 514 while its emitter electrode is connected through a resistor 516 to the cathode electrode of a controlled rectifier device 518. The controlled rectifier 518 may be of any suitable type and has its anode electrode connected to power bus 500 and its gate electrode connected to the junction point of resistor 510 and the collector electrode of transistor 512. The junction of the cathode electrode of controlled rectifier 518 and resistor 516 is connected to a resistor 520 which has its other end connected to the emitter electrode of a unijunction transistor 522. The emitter electrode of unijunction transistor 522 is coupled to ground through a storage capacitor 524. The collector-emitter path of an NPN transistor 526 is connected in parallel with storage capacitor 524 and has its base electrode connected to resistor 508.

The unijunction transistor 522 has a first base electrode coupled to power bus 500 through a biasing resistor 528 and a second base electrode connected through a coupling resistor 530 back to the base electrode of transistor 512. The second base electrode of unijunction transistor 522 is additionally connected to one end of a resistor 532, which has its other end grounded, and to the anode electrode of a diode 534 which has its cathode electrode connected to the gate of a controlled rectifier 536 which may be of any suitable type, similar to rectifier 518, and has its anode coupled to power bus 500 and its cathode coupled to ground through a biasing resistor 538. The gate of controlled rectifier 536 is also coupled to ground through the collector-emitter path of an NPN transistor 540 which has its base electrode connected through a storage capacitor 542 to ground. A timing circuit is connected to the cathode electrode of controlled rectifier 536 and includes a coupling resistor 544 which is connected to the junction point of a storage capacitor 546 and the emitter electrode of a unijunction transistor 548. The storage capacitor 546 is returned to ground while the unijunction transistor 548 has a first base electrode connected to power bus 500 through a resistor 550 and a second base electrode which is coupled through a resistor 552 back to the base electrode of transistor 540. The second base electrode of unijunction transistor 548 is further coupled to ground through a biasing resistor 554.

The reset timer 46 is adapted to provide energizing potential to the reset pulser 44 for a preselected time interval by the connection of power bus 402 of the reset pulser 44 with the cathode electrode of controlled rectifier 536 of the reset timer 46.

In describing the operation of the present invention, it will be assumed that an alphanumeric message in the form of an exemplary four-digit number 3-2-1-2 is generated by the tone-burst generator 10. Referring to FIG. 2, curve A is a timing curve illustrating the tone burst output signals from the generator 10, each single tone burst being of approximately 60 milliseconds in duration and being spaced from one another by a 40 millisecond blank interval to form a series of tone-burst trains, with the end of each tone-burst train separated by a 360 millisecond interval from the beginning of the next tone-burst train in the incoming message signal. It should be understood, of course, that the timing characteristics of the tone burst input signals may be varied in accordance with particular desired operational characteristics; however, the timing constants and circuit parameters of the various subcircuit assemblies of the present invention must be accordingly varied so that an incoming message may be accurately received. The message signal as shown in curve A contains four tone-burst trains, each train respectively including three tone bursts, two tone bursts, one tone burst and two tone bursts corresponding to the four digit number 3-2-1-2 to be displayed.

Referring to FIG. 3, the output from the tone-burst generator 10 is fed via line 100 and coupling capacitor 102 to the input of the first amplifying stage 104 of the burst converter 12 whereupon the tone burst signals are amplified and fed through coupling capacitor 132 to the second amplifying stage 134. The signals are further amplified in amplifying stage 134 and are thereafter coupled through coupling capacitor 140 to the rectifying and smoothing network formed by diodes 142 and 144, resistor 146 and capacitor 148. The rectified tone burst signals are then fed to the input of wave shaping network 150 at the base electrode of transistor 152 where the signals are shaped and applied as a positive signal through diode 164 and resistor 166 to output transistor 168. Thus, upon the receipt of each tone burst of the received message, a positive pulse will be fed to the base of transistor 168 causing it to conduct for the duration of each individual tone burst, and each time transistor 168 conducts, the voltage level at its emitter electrode is increased from zero to the potential level appearing at main power bus 112. Therefore, the potential at the emitter of transistor 168, as illustrated in curve B of FIG. 2, consists of a series of pulse trains each of which corresponds to a tone-burst train of the received alphanumeric message. Referring again to FIG. 3, the positive pulse train signals at the emitter of transistor 168 are coupled through resistor 172 to the base of transistor 174 which is rendered conductive upon the receipt of each pulse such that its collector-emitter path exhibits a low impedance thereby tying the count input 16 (FIG. 1) of the steering network 18 to ground for the duration of the pulse.

As shown in FIG. 4, the count input 16 is connected through terminal pin 15 to the wiper arm 320 of rotary switch 318 of steering network 18. When switch 318 is in a reset or standby condition, as illustrated in FIG. 4, wiper arm 320 is in contact with fixed contact zero (0) such that the selective grounding of the count input 16 through transistor 174 (FIG. 3) causes the selective grounding of the junction point of terminal pins 2 and 3 of counter 28 through line 326, terminal pin 14 of the steering network 18, contact pin 0 of the rotary switch 318, wiper arm 320, line 322, terminal pin 15, count input 16, and the collector-emitter path of transistor 174. Since terminal pin 1 of counter 28 is directly connected to power bus 304 so as to receive positive operating voltage, and since the stepping coil of the counter is internally connected across terminal pins 1 and 2 (in the manner illustrated within steering network 18), each time the terminal pin 2 is grounded by the action of the transistor 174 of burst converter 12, current flows through the counter stepping coil causing the rotary switch of the counter to advance one position such that its display wheel moves from position 0 to position 1. Referring to FIG. 2, since the initial pulse train of the burst converter output (curve B) contains three pulses, the transistor 174 of the burst converter 12 will be rendered conductive three times in succession such that the stepping coil of counter 28 will be pulsed three times causing rotation of its display wheel to a position for displaying the numeral 3.

At this same time, the burst converter output at the emitter of transistor 168 is fed via line 176 to the input of digit shifter 36, as shown in FIG. 3. As the voltage at the emitter of transistor 168 increases in response to the receipt of the first tone burst of the incoming message, a positive signal is fed through diode 200 and resistor 204 to the gate electrode of controlled rectifier 206 which is thereafter rendered conductive to apply positive potential from power bus 234 through resistor 210 to the storage capacitor 218 as well as to the emitter electrode of unijunction transistor 212. Since the positive-going voltage on line 176 is also coupled through resistor 202 to the base of transistor 220 the transistor is rendered conductive so as to shunt the storage capacitor 218 and prevent the voltage level appearing at the emitter electrode of unijunction transistor 212 from rising above ground potential. The unijunction transistor 212 is therefore maintained in a nonconductive state until the first tone burst terminates. When the initial tone burst terminates, transistor 168 of the burst converter 12 becomes nonconductive, and its emitter voltage drops back to zero. As a result, the input voltage fed via line 176 to the digit shifter 36 correspondingly drops to zero causing the transistor 220 to revert to its nonconductive state while controlled rectifier 206 remains latched on. Thus, with the shunt removed, the storage capacitor 218 builds up a charge as current flows from power bus 234 through controlled rectifier 206 and resistor 210 to ground. In this manner, the voltage level at the emitter of unijunction transistor 212 begins to rise as the storage capacitor 218 accumulates a charge.

The timing constant provided by the charging path of capacitor 218 is such that the unijunction transistor 212 will fire three hundred milliseconds after a tone burst has terminated. If, however, a second tone burst follows the first tone burst by an interval of less than 300 milliseconds, i.e, before the unijunction transistor 212 has fired, the transistor 220 will receive a positive signal from the emitter of transistor 168 and will shunt the capacitor 218 such that any charge accumulated thereacross is immediately dumped to ground. Upon the termination of the second received tone burst, the transistor 220 will again be placed in its nonconductive state to allow the capacitor 218 to begin to charge once again. Thus, the selective charging and discharging of capacitor 218 will continue in the above described manner until the last tone burst within a tone-burst train is received. Thereafter, the transistor 220 will revert to its nonconductive state, capacitor 218 will begin to charge, and after a 300 millisecond interval the unijunction transistor will fire. When unijunction transistor 212 fires, the positive voltage appearing at the gate of the conductive controlled rectifier 206 will be fed through the unijunction transistor to coupling capacitor 222 which applies a pulse signal to the gate of controlled rectifier 232 such that it is triggered to its conductive state. At the same time, the firing of unijunction transistor 212 rapidly shunts the gate of controlled rectifier 206 to ground through resistor 216. This causes the controlled rectifier 206 to be extinguished which in turn permits unijunction transistor 212 to revert to its nonconductive state.

It should be understood that the various controlled rectifiers used in the circuit of the present invention may be of any suitable type the only requirement being that each of the devices have the capability of being turned on by a signal momentarily applied to its gate electrode and that it remain on thereafter until the gate is either shunted to ground or fed with a negative pulse. It is important to note that many conventional SCR devices, for example, can be effectively extinguished after they have been latched on by grounding the gate electrode through a low impedance path as in the present circuit. Since the gate electrode potential is high when the device is conductive, and since the internal capacity of the SCR is in many cases of considerable value, grounding of the gate electrode effectively impresses a negative pulse thereacross which causes the device to revert back to its nonconductive condition. Of course, other techniques of extinguishing the various controlled rectifiers utilized in the preferred embodiment of the present invention may be employed as desired, such as by directly shunting the anode cathode path of the device or by momentarily removing anode potential therefrom.

Thus, 300 milliseconds after the termination of the last burst of a received tone-burst train, the unijunction transistor 212 will be turned on to simultaneously extinguish controlled rectifier 206 and fire controlled rectifier 232. When controlled rectifier 232 is conductive, operating potential from power bus 234 appears at its cathode electrode and at its gate electrode. The potential at the cathode is fed through resistor 238 to transistor 240 which is thereafter rendered conductive so as to turn on transistor 246 and tie the shift input 40 (FIG. 4) of the steering network 18 to ground. At this same time, the positive potential at the gate of controlled rectifier 232 is fed through resistor 224 to storage capacitor 226 which begins to charge. After a 60 millisecond interval, as determined by the RC time constant associated with capacitor 226, the firing point of unijunction transistor 228 will be reached, and the unijunction transistor will become conductive to extinguish the controlled rectifier 232 thereby turning off transistor 240 and permitting transistor 246 to become nonconductive. Thus, the potential at the emitter of transistor 240 has the wave shape illustrated in curve C of FIG. 2, and the shift input 40 of the steering network 18 is grounded for a period of 60 milliseconds due to the cooperative action of controlled rectifier 232 and unijunction transistor 228.

Referring now to FIG. 4, when the shift input 40 of steering network 18 is tied to ground by the transistor 246, a current path is completed between the power bus 304, line 302, stepping coil 300, line 306 and ground. Thus, the rotary switches 312 and 318 as well as display wheel 324 will be stepped one position such that wiper arm 310 will be placed in contact with its associated fixed contact 1, wiper arm 320 will be placed in contact with its associated fixed contact 1 and display wheel 324 will be rotated to display the numeral 1. Thus, the number 1 is displayed by the steering network 18 indicating that the first digit of a received alphanumeric message has been properly received and that rotary switch 318 has been stepped one position such that wiper arm 320 is moved away from fixed contact 0 and against fixed contact 1. With wiper arm 320 in electrical contact with fixed contact 1 of rotary switch 318, the count input 16 is directly connected by line 322, wiper arm 320, fixed contact 1, and line 328 to pin 2 of counter 30.

Referring again to FIG. 3, upon the receipt of the second tone-burst train of the incoming alphanumeric message, the burst converter 12 will again cause the generation of positive pulses at the emitter of transistor 168. Since the second tone-burst train includes two tone bursts, the emitter of transistor 168 will produce two positive-going pulses which will cause transistor 174 to be rendered conductive twice in succession such that the count input 16 of steering network 18 is grounded twice through the transistor. Since rotary switch 318 was previously stepped to its first position, the grounding of count input 16 causes the grounding of pin 2 of counter circuit 30 so as to energize its stepping coil twice and move its display wheel to its second position for displaying the numeral 2.

At the same time that transistor 174 is alternately rendered conductive and nonconductive by the potential existing at the emitter of transistor 168, the digit shifter 36 is placed in a standby state in the same manner as described above in response to the first received tone-burst train. In other words, as the first positive pulse appears at the emitter of transistor 168, the controlled rectifier 206 is fired; however, transistor 220 is also rendered conductive so as to prevent a charge from building up across storage capacitor 218. Upon the termination of the first pulse in the pulse train, the transistor 220 will revert to its nonconductive state and capacitor 218 will begin to charge. Since a second pulse exists in the second pulse train of the illustrated example, when the emitter of the transistor 168 goes positive again, transistor 220 will again be rendered conductive so as to dump the stored charge of capacitor 218 prior to the generation of a sufficiently large potential at the emitter of unijunction transistor 212 to cause it to fire. As before, when the second pulse (which is the last pulse in the second pulse train) has terminated, transistor 220 will revert to its nonconductive condition, capacitor 218 will begin to charge, and after 300 milliseconds, the unijunction transistor 212 will fire. When the unijunction transistor 212 fires, controlled rectifier 206 will be extinguished and controlled rectifier 232 will be simultaneously triggered on. With the controlled rectifier 232 on, transistor 240 is rendered conductive so as to apply a positive pulse to the base electrode of transistor 246 such that the shift input 40 of steering network 18 is tied to ground. The timing circuit including unijunction transistor 228 and storage capacitor 226 shunts the gate of controlled rectifier 232 to ground after a 60 millisecond interval has elapsed such that the controlled rectifier 232 is turned off or extinguished to thereby turn off transistor 240 and permit transistor 246 to release the ground connection of shift input 40.

As seen in FIG. 4, the 60 millisecond grounding of shift input 40 by transistor 246 causes the completion of a current path from power bus 304 through stepping coil 300 to ground such that rotary switches 312 and 318 as well as the display wheel 324 are moved one position such that the wiper arms of the respective switches are placed in electrical contact with fixed contacts 2 and the display wheel 324 is moved so as to display the numeral 2. In this manner, the second character of the incoming alphanumeric message is displayed by the counter 30, and the steering network 18 is programmed so as to direct the next incoming pulse train to the next succeeding counter 32 through wiper arm 320 and fixed contact 2 of rotary switch 318.

The above described operation will continue in sequence until all four characters of the exemplary number 3-2-1-2 are received and displayed by the counters 28, 30, 32 and 34, respectively, as illustrated in FIG. 1. It is also noted that the steering network 18 displays the number 4 upon completion of the receipt, conversion and display of the incoming alphanumeric message so as to inform the operator that four digits have been received and should be displayed by the counter circuits 28 through 34. In this manner, the operator is provided with a means of verifying the readout of a received message.

After the message has been received and the operator has taken a desired course of action, the steering network 18 and counter circuits 28 through 34 can be reset either manually or automatically by the reset pulser 44 and reset timer 46. Referring to FIG. 5, if manual reset operation is desired, switch 400, which is mechanically biased to an open position, is held closed by an operator such that power from power point A is fed to power bus 402 to supply flip-flop 404 which thereafter begins to oscillate. The resultant square-wave signal appearing at the collector of transistor 408 of the flip-flop 404 is fed through resistor 410 to transistor 412 which is alternately switched on and off to produce a positive square-wave signal at its emitter. The potential at the emitter of transistor 412 is coupled to the base of transistor 418 so that the collector of transistor 418, which is connected to the reset input line 42, is alternately tied to ground and released in response to the square-wave produced by flip-flop 404.

As seen in FIG. 4, the reset input line 42 is connected to pin 4 of steering network 18 through a diode 316 and is similarly connected to pins 4 of counter circuits 28 through 34 by respective diodes 342, 344, 346 and 348. As illustrated by the details of the steering network 18, the rotary switches of the steering network and the various counter circuits are connected in series with their respective stepping coils from terminal pin 4 through the commonly connected fixed contacts of the rotary switch, the wiper arm, terminal pin 3, the external connection of terminal pin 3 and terminal pin 2, terminal pin 2, and the stepping coil to terminal pin 1. Thus, since terminal pin 1 is connected to power bus 304, and since the rotary switch is in series with the stepping coil across terminal pins 1 and 4, the rotary switch and display wheel of the steering network as well as the counters will be continuously stepped any time the reset input line 42 is grounded and the wiper arms of the respective rotary switches are in contact with any of their fixed contacts other than contact 0. In this manner, upon the actuation of switch 400 (FIG. 5) of reset pulser 44, the reset line 42 will be alternately tied to ground and released such that the various stepping coils in the steering network and the counter circuits will be alternately energized until the rotary switches and display wheels are returned to their zero or reset positions, exemplified by the illustrated positions of the components of steering network 18 of FIG. 4. Thus, by simply holding down normally open switch 400 of reset pulser 44, all of the counter circuits and the steering network 18 will be returned to their zero or reset positions whereupon switch 400 may be released and a succeeding incoming alphanumeric message can be received.

Referring to FIG. 5, if automatic reset operation is desired, two-position switch 504 is moved to its closed position prior to the receipt of an incoming message so as to apply operating potential from power point A through line 502 and power bus 500 to the gate of controlled rectifier 518. The positive potential from power bus 500 is also fed through the closed switch 504 and resistor 508 to the base of transistor 526. Thus, upon closure of switch 504, the controlled rectifier 518 will fire and will apply operating potential from the power bus 500 through resistor 520 to the parallel network formed by storage capacitor 524 and transistor 526. Since transistor 526 is rendered conductive by the positive potential fed to its base through resistor 508, the storage capacitor 524 will be precluded from building up a charge so that the emitter of unijunction transistor 522 will be held at ground potential. The reset timer is thus conditioned to automatically energize reset pulser 44 for a time interval sufficient to cause resetting of counters 28 through 34 and steering network 18. Such automatic energization is initiated by reopening switch 504 whereupon the controlled rectifier 518 will remain latched on; however, positive potential will no longer be fed to the base of transistor 526 allowing transistor 526 to turn off and a charge to build up across storage capacitor 524. After a short interval, which may be 2 seconds, for example, as determined by the RC time constant associated with storage capacitor 524, the unijunction transistor 522 will fire causing the potential at the junction of the second base of the unijunction transistor and the resistor 532 to be rapidly increased to a positive level. This positive signal is fed back by resistor 530 to the base of transistor 512 which is thereafter rendered conductive so as to extinguish the controlled rectifier 518.

The positive-going signal at the second base electrode of unijunction transistor 522 is simultaneously applied through diode 534 to the gate electrode of controlled rectifier 536 which, when conductive, will apply positive operating potential from power bus 500 through line 402 to the reset pulser 44 which is thus energized so as to generate a reset pulse train at reset input line 42.

At this same time, the current flowing through controlled rectifier 536 initiates the operation of a second timing circuit formed by unijunction transistor 548 and storage capacitor 546. The storage capacitor 546 will build up a charge which will be sufficient to fire the unijunction transistor 548 approximately three seconds after controlled rectifier 536 has been fired. When the unijunction transistor 548 fires, the positive potential from bus 500 will be applied to the junction of resistors 552 and 554 such that a positive feedback signal will be fed to the base electrode of transistor 540. The transistor 540 is thus rendered conductive to extinguish the controlled rectifier 536 removing energizing potential from power bus 402 of the reset pulser 44 and terminating the reset pulse train applied to the reset input line 42.

Thus, when switch 504 is initially closed, the reset timing circuit 46 is programmed such that when switch 504 is subsequently reopened, a two second delay interval will elapse and thereafter, the reset pulser 44 will be energized for three seconds. By utilizing reset timer 46, the necessity of an operator maintaining switch 400 closed until the counters and steering network are reset is obviated, and complete resetting of the circuit is assured. It is noted that switch 504 may be of any suitable type and may be mechanically linked with a switch or lever (not shown) which, when operated, performs an additional function not directly related to the display of the incoming message. For example, such additional function may correspond to the transmission of an acknowledge signal to a remote point at which the alphanumeric message originates. In other words, when the display circuit of the present invention is utilized in conjunction with a remote point monitoring system, and when the operator at the central location receives a signal indicating that an alphanumeric message is to be transmitted, the acknowledge lever (not shown) and switch 504 of the reset timer 46 may be moved to their closed positions such that the remote point is notified that the central station is ready to receive the message and the reset timer is placed in its standby or preconditioned state. Subsequent to the receipt and display of the message, the acknowledge lever as well as the switch 504 are opened and the display circuit will be automatically reset for the reception of a subsequent message.

To briefly summarize the overall operation of the circuit of the present invention, reference will be made to the block diagram of FIG. 1 and the timing curves illustrated in FIG. 2. As described in detail above, upon receipt of a tone-burst message of the form illustrated in curve A of FIG. 2, the burst converter 12 will amplify the tone-bursts, rectify and filter the amplified tone-bursts and shape the rectified signals so as to provide a series of pulse trains at its output, as illustrated in curve B. The pulse trains will be fed through the line 14 to the count input 16 of steering network 18 which will direct the first pulse train via line 20 to the first pulse counter 28. The individual pulses in the first train will cause the pulse counter 28 to be stepped a corresponding number of positions so as to display a first alphanumeric character, illustrated in FIG. 1 as numeral 3. The digit shifter 36 will also receive the pulse train output of burst converter 12 and will provide a shift output signal (curve C) at its output line 38 three hundred milliseconds after the termination of the last pulse in the pulse train.

The shift pulse is fed to shift input 40 of steering network 18 causing it to be stripped one position such that subsequent pulses fed to the count input 16 will be directed over line 22 to the second pulse counter 30. In addition, the steering network 18 will display the number 1 indicating that one digit of the incoming message has been received and displayed by the pulse counter 28. Thereafter, the second pulse train from the burst converter 12 will be fed to pulse counter 30 which will be stepped by a number of positions corresponding to the number of pulses within the second pulse train so as to display the second character of the message. As before, the digit shifter 36 will detect the termination of the second pulse train and three hundred milliseconds later will generate a 60 millisecond shift signal (curve C) to step the steering network 18 such that it directs the next pulse train to the third pulse counter 32 and simultaneously displays the number 2 indicating that two digits of the incoming message have been received.

This process will continue until all the digits of the incoming message have been received whereupon the complete message, selected as the four digit number 3-2-1-2 for purposes of example, will be explained in a manner which is visually perceptible by the operator. Subsequent to the receipt of the complete message, the operator may manually energize reset pulser 44 so as to generate a reset pulse signal on line 42 for repositioning steering network 18 and counter circuits 28 through 34 to their zero or reset positions. In addition, and in lieu of manual energization of reset pulser 44, the reset timer 46 may be utilized to provide a 3 second energization interval of reset pulser 44 whereupon the steering network and the pulse counters are automatically placed in their reset positions.

Thus, the present invention is adapted to accurately and readily convert and display a tone burst coded message received either directly or through a suitable communication medium such as a telephone line or a radio frequency link.

Inasmuch as the present invention is subject to many variations, modifications and changes in detail, it is intended that all matter contained in the foregoing description or shown in the accompanying shall be interpreted as illustrative and not in a limiting sense.

What is claimed is:

1. In a message readout circuit responsive to a coded alphanumeric message formed by a series of spaced tone burst signals, the combination comprising input means adapted to receive the coded alphanumeric message;

means connected with said input means for generating a series of spaced pulse trains in response to the series of spaced tone burst signals;

a plurality of readout means each having an input and perceptibly displaying an alphanumeric character corresponding to a received pulse train at said input;

switching means connected with said inputs of said plurality of readout means and said generating means applying said pulse trains to one of said plurality of readout means and responsive to a shift signal for applying said pulse trains to a next succeeding one of said plurality of readout means; and means connected with said switching means and said generating means for detecting a termination of each one of said series of spaced pulse trains and generating said shift signal in response to said pulse train termination, said shift signal generating means including timing means energized in response to receipt of one pulse of each of said pulse trains and generating said shift signal a preselected time delay after energization;

said timing means including a controlled rectifier having a normally off state and switchable to an on state in response to each pulse of said pulse trains and time delay means including a storage capacitor connected with said controlled rectifier and responsive to actuation of paid controlled rectifier to said on state to develop a particular stored potential thereacross after said preselected time delay, said time delay means further including a unijunction transistor connected with said storage capacitor and firing in response to the development of said particular stored potential across said storage capacitor to generate said shift signal, said shift signal generating means further including circuit means connected with said storage capacitor and said pulse train generating means for discharging said storage capacitor in response to receipt of a next succeeding pulse of each of said pulse trains within said preselected time delay whereby said shift signal is generated said preselected time delay after receipt of a last pulse in each of said pulse trains.

2. The invention as recited in claim 1 wherein said circuit means includes a transistor connected with said storage capacitor to discharge said storage capacitor in response to the generation of each pulse of said pulse train.

3. The invention as recited in claim 2 wherein said timing means includes pulse forming means connected with said unijunction transistor for generating said shift signal in response to the firing of said unijunction transistor.

* * * * *